April 17, 1956 P. M. SHEY 2,742,323
WASHING ATTACHMENT FOR HOSES
Filed Nov. 21, 1950 2 Sheets-Sheet 1
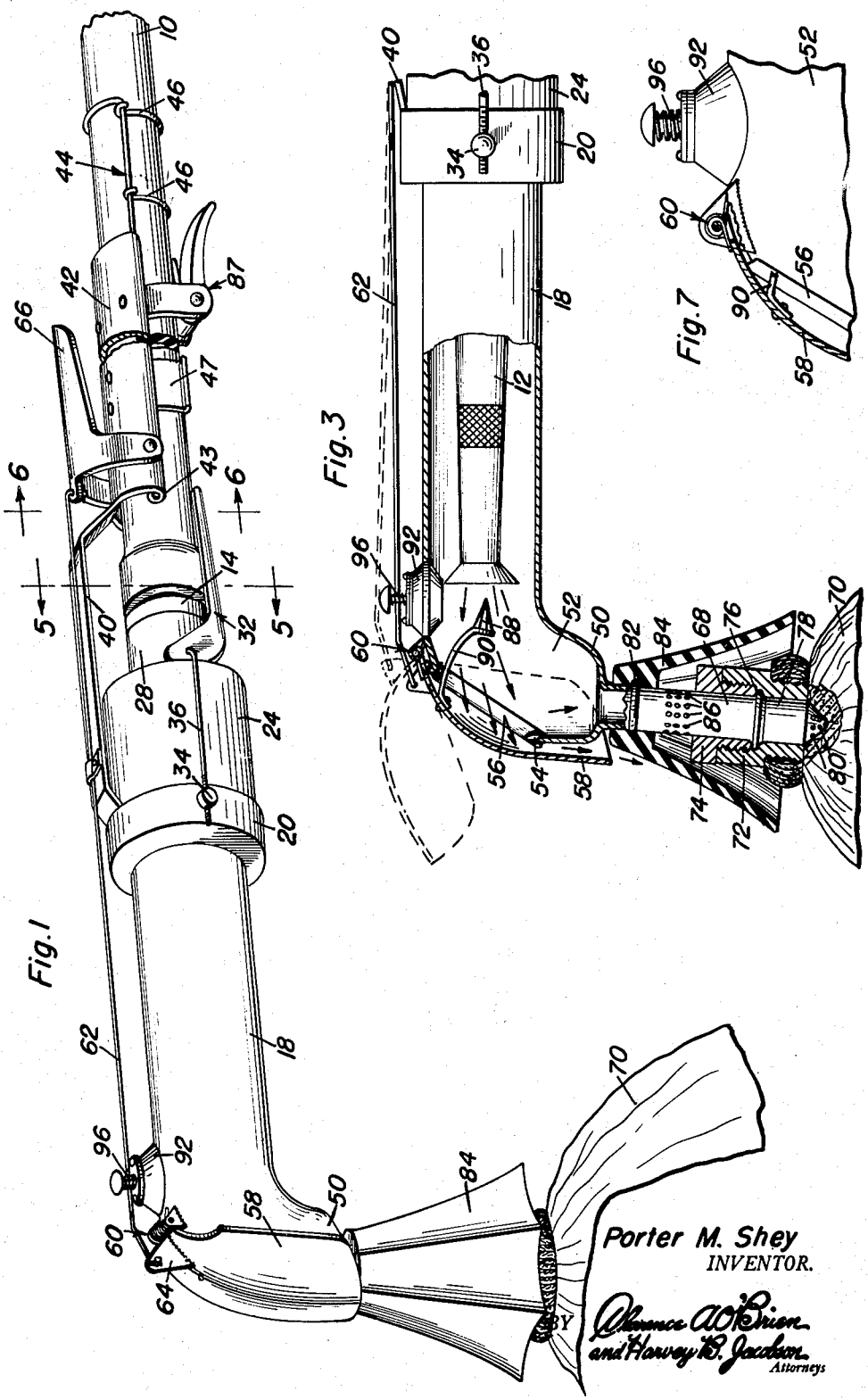
Porter M. Shey
INVENTOR.

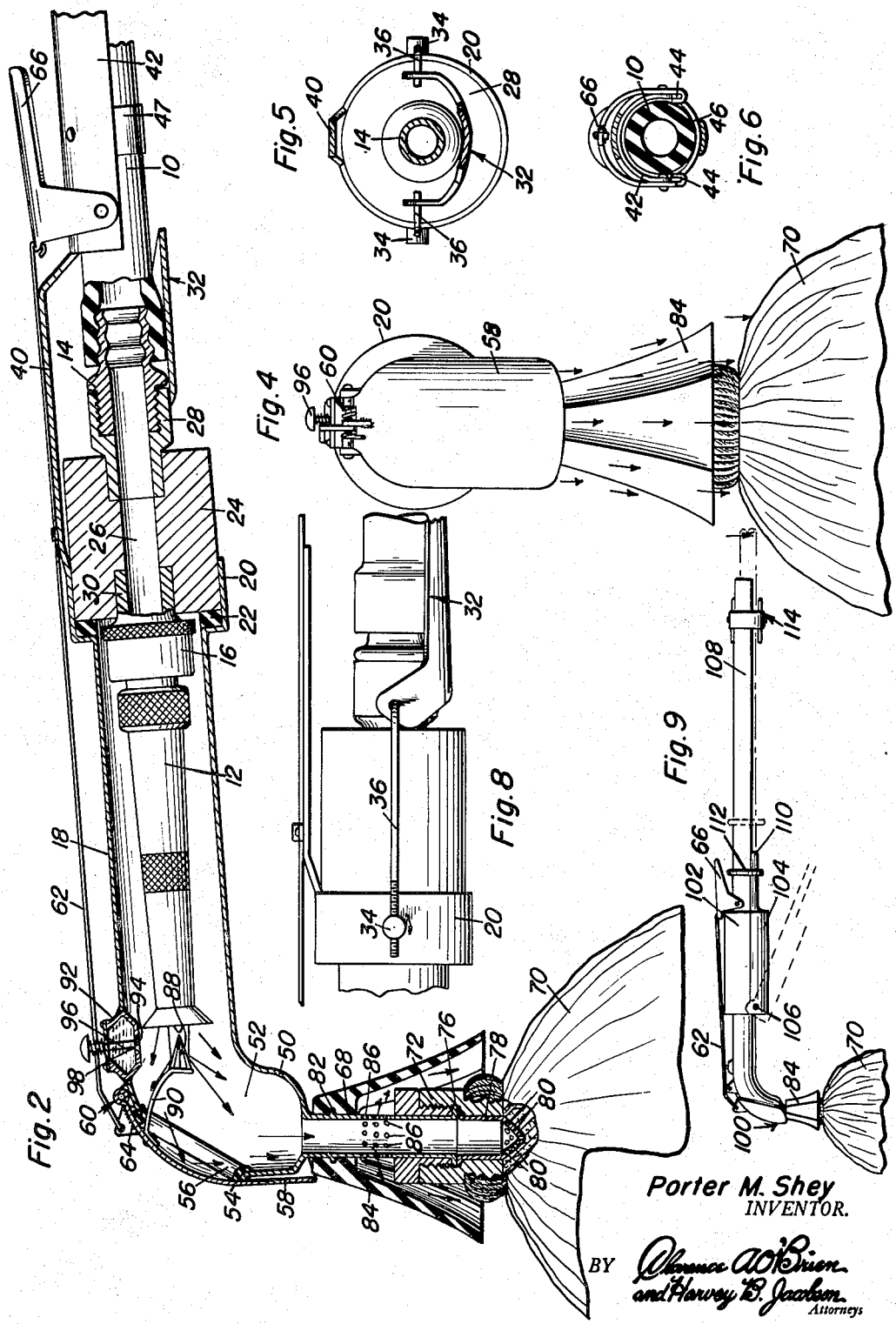

United States Patent Office 2,742,323
Patented Apr. 17, 1956

2,742,323

WASHING ATTACHMENT FOR HOSES

Porter M. Shey, Detroit, Mich.

Application November 21, 1950, Serial No. 196,840

5 Claims. (Cl. 299—111)

This invention relates to improvements in devices for connecting to hoses and nozzles for the purpose of facilitating washing automobiles, houses, porches and the like and is a continuation-in-part of my copending application, Serial No. 191,030 filed October 20, 1950, now Patent No. 2,673,999, issued April 6, 1954.

An object of this invention is to provide an improved attachment which connects to a standard hose and a standard nozzle, constituting a washing head for an automobile or the like, said head being so structurally arranged as to apply abundant water to a mop carried by the attachment or at the selection of the user provide a stream of water.

Ancillary objects and features of importance will become apparent in following the description of the illustrated forms of the invention.

In the drawings:

Figure 1 is a fragmentary perspective view of the device;

Figure 2 is a longitudinal sectional view of the device in Figure 1;

Figure 3 is a fragmentary sectional view of the attachments;

Figure 4 is a front view of the attachment;

Figure 5 is a sectional view taken substantially on the line 5—5 of Figure 1 and in the direction of the arrows;

Figure 6 is a sectional view taken on the line 6—6 of Figure 1 and in the direction of the arrows;

Figure 7 is a fragmentary sectional view showing a part of the closure at the outer end of the attachment and the means for issuing soap into the mixture chamber;

Figure 8 is a fragmentary elevational view showing primarily the action clamp constituting a means for holding the device assembled; and, Figure 9 is a modification of the invention, it differing from the more detailed illustration in the means of holding the hose and nozzle within the attachment.

Referring now to Figures 1–8 there is a conventional hose 10 and a conventional nozzle 12. The hose 10 has a male coupling 14 at one end while the nozzle 12 has the usual female coupling sleeve 16 connected to it. Employing these standard parts with an attachment for washing vehicles is the precise summation of the invention.

The washing head or attachment has a tube forming a part thereof, this tube being enlarged as at 20 to accommodate the gasket or washer 22. A block 24 having a liquid passage 26 therein is disposed in the enlargement 20 and has its inner wall abutting the resilient gasket 22 so as to prevent liquid from flowing between the block 24 and the enlargement 20.

There is a standard male coupling 28 at one end of the block with its bore in communication with the passage 26. By this coupling 28 connecting to the coupling 14, the hose 10 is connected with the block 24. At the opposite end of the block there is a male coupling 30 which is threaded in the internally threaded collar 16 of the nozzle.

An action clamp 32 of the over-center locking type is secured to the enlargement 20 by means of the pivots 34 and is arranged to press against one surface of the block 24 holding it in squeezing relation with the gasket 22. The legs 36 of the action clamp 32 are threaded at their outer ends so that they can be adjusted as to effective length, these threaded ends being carried by the pivots 34.

A rearwardly extending arm 40 is connected to the enlargement 20 and has a saddle bearing 42 fixed thereto. This saddle bearing has rolled edges constituting bearings 43 (Figure 1) so as to accommodate the ends of the wire cradle support 44. This cradle support is arranged to hold the hose 10 thereby supporting it. The bottom members 46 of the cradle type support are hinged to the legs so that they may be latched and released for the purpose of more easily inserting and removing the hose 10. The resilient clamp 47 connected to the bearing 42 is used also to hold the hose.

There is a curved member 50 which forms an extension of the tube 18, the curved member defining a liquid mixing chamber 52. As disclosed in Figure 2 the curved extension 50 of the tube 18 is almost but not quite arranged at right angles to the axis of the tube 18.

There is an opening 54 in the member 50 which is in alignment with the nozzle 12. A grommet 56 is secured around the edges of the opening 54 and serves as a stop for the closure plate 58. This closure plate is connected to the tube 18 by means of a spring loaded hinge 60 constantly pressing the closure 58 in such position as to prevent water from passing through the opening.

An operating link 62 for the closure 58 is pivoted to a bracket 64 carried by the closure 58 and also to a lever 66, this lever being pivoted to the saddle bearing 42.

There is a sleeve 68 fixed to the enlarged member 50 and this neck is provided with means for holding the mop 70 thereon. An internally and externally threaded sleeve 72 has one end of the mop 70 threaded on the external threads. The internal threads are engaged with the external threads of an apertured plug 74. This apertured plug has the neck 68 passed therethrough, said neck 68 being provided with a lower laterally extending flange 76 on which one end of the threaded plug 74 rests. This assembly holds the mop 70 in place on the sleeve 68.

There is a water diffuser 78 located in the sleeve 72 and abutting the under surface of the flange 76. The lower end of this diffuser is preferably conical in shape and provided with a plurality of orifices 80, these orifices opening into the center part of the mop for the purpose of introducing washing liquid into the center section of the mop.

The neck 68 has a flange 82 near its upper end, this flange constituting a means for holding the water deflector 84 on the outside of the neck 68. This water deflector is in the form of a skirt and overlies but is spaced from a plurality of apertures 86 which are formed in the neck 68. These apertures are used for the purpose of supplying liquid on the outside of the mop 70, after the liquid has struck the inside surfaces of the side walls of the deflector or skirt 84. It is noted that the lower edge of the closure 58 overlies a part of the upper end of the water deflector, for operational reasons to be discussed subsequently.

There is a diffuser 88 carried by an arm 90, this arm being fixed to the closure 58. The structural elements are so arranged that when the closure 58 prevents water from passing through the opening 54, the diffuser 88 is in axial alignment with the nozzle and hence the stream of water issuing therefrom.

A liquid soap receptacle 92 is connected to the tube 18 and has an outlet 94 therein. A valve stem 96 having a spring constantly keeping the valve head 98 in the outlet closing condition, is located in the receptacle and arranged for manual operation. The outlet 94 is so located with respect to the chamber 52 that soap may be introduced into the stream of water in accordance with the prerogative of the user of the device.

The operation of the invention is as follows:

The hose 10 through its couplings is connected to the block 24. The nozzle 12 is also connected to the block 24. Then the nozzle, hose together with the block and all of the other pertinent structure is operatively connected with the tube 18 by means of the action clamp 32. The cradle support with a hose is fastened in place and the device is ready for use.

In use after the water is turned on, the liquid from the nozzle strikes the diffuser, flows into the chamber 52, through the bore of the neck 68 and into the mop. At the same time liquid passes through the apertures 86 and flows downwardly as guided by the inside surface of the deflector 84. This causes the liquid to wet the outside of the mop.

By pulling the lever 66 a small amount the closure 58 is opened. This allows some of the water from the nozzle to flow through the opening 54 and be directed by the lower edge of the closure 58 to the outside surface of the water deflector 84. This further wets the outside of the mop and may be used to direct water against the surface which is to be cleaned in advance of the actual mop 70.

By opening the closure 58 farther, the diffuser is moved so that it will cause little or no interference with the stream of water issuing from the nozzle. At that time the stream passes directly through the opening 54 in order to wet the surface to be cleaned.

Attention is now invited to Figure 9 wherein a slight modification of the invention is disclosed. The head assembly generally indicated at 100 is identical to the head assembly shown in Figure 2. The main difference of construction is that the part of the device holding the nozzle and the hose is somewhat simplified. There is an upper section 102 substantially semi-cylindrical in shape and a lower section 104 which is also substantially semi-cylindrical. These sections are pivoted by the pin 106 so that they may be spread apart whereby a part of the hose and the nozzle is disposed therebetween. A reduced saddle bearing 108 extends from the section 102 and is arranged to overlie a part of the standard hose. A reduced extension 110 is connected to the section 104, the saddle bearing and extension being adapted to accommodate the locking ring 112 which slides upon these members.

There is a clamp 114 arranged to keep the hose secure under the saddle bearing 108 at a point spaced from the mop 70, thereby preventing it from becoming entangled while using the device.

The choke clamp 87, riveted to the bearing 42, is used to momentarily check the flow of water, particularly when the device is used in a vertical position.

Having described the invention, what is claimed as new is:

1. A washing head attachment for hoses comprising a tube adapted to be mounted on the end of a hose, means connected to said tube for mounting the same on the hose and stiffening the portion of the hose adjacent the end thereof whereby the hose will serve as a handle for the head, said means including a saddle bearing extending rearwardly from said tube for partially embracing the end portion of the hose, means at one end of said saddle bearing for embracing the hose and retaining it against the saddle bearing, and means slidably disposed on said saddle bearing for retaining selected lengths of hose remote from said one end in engagement with said saddle bearing.

2. The combination of claim 1 wherein said means at said one end comprises a clamping holder pivotally attached to said saddle bearing.

3. The combination of claim 1 wherein said slidably disposed means comprises a ring clamp.

4. The combination of claim 1 wherein said means at said one end comprises a clamping holder pivotally attached to said saddle bearing, a locking ring embracing said bearing and said holder to retain the holder in closed position.

5. The combination of claim 1 wherein said means at said one end comprises a clamping holder pivotally attached to said saddle bearing, a locking ring embracing said bearing and said holder to retain the holder in closed position, said slidably disposed means comprising a ring clamp.

References Cited in the file of this patent
UNITED STATES PATENTS

| 1,549,258 | Jernholm | Aug. 11, 1925 |
| 1,994,085 | Jackson | Mar. 12, 1935 |

FOREIGN PATENTS

| 577,564 | France | Sept. 8, 1924 |